United States Patent
Renaker, Jr.

(10) Patent No.: US 6,780,631 B2
(45) Date of Patent: Aug. 24, 2004

(54) METHOD AND APPARATUS FOR DECOMPOSITION OF OIL

(76) Inventor: John J. Renaker, Jr., 13250 Betsworth Rd., P.O. Box 1657, Valley Center, CA (US) 92082

( * ) Notice: Subject to any disclaimer, the term of this patent is extended or adjusted under 35 U.S.C. 154(b) by 296 days.

(21) Appl. No.: 10/008,139

(22) Filed: Nov. 12, 2001

(65) Prior Publication Data

US 2003/0092167 A1 May 15, 2003

(51) Int. Cl.$^7$ ................................................. C12S 13/00
(52) U.S. Cl. ..................... 435/262; 435/262.5; 435/264
(58) Field of Search ............................. 435/262, 262.5, 435/264; 210/924

(56) References Cited

U.S. PATENT DOCUMENTS

| | | | |
|---|---|---|---|
| 3,871,956 A | * 3/1975 | Azarowics | 435/281 |
| 4,415,661 A | * 11/1983 | Thirumalachar et al. | 435/174 |
| 5,009,790 A | 4/1991 | Bustamante et al. | |
| 5,154,235 A | 10/1992 | Renaker, Jr. et al. | |
| 5,395,535 A | * 3/1995 | Pinckard | 210/691 |
| 6,187,581 B1 | * 2/2001 | Sicotte et al. | 435/262 |

\* cited by examiner

*Primary Examiner*—William H. Beisner
(74) *Attorney, Agent, or Firm*—Gordon & Rees LLP

(57) ABSTRACT

A method is described for the decomposition of oil in which one applies to oil a composition made of bacteria-containing, dealginated, partially dewatered kelp residue. The composition will have a water content no greater than 25%, preferably about 5%–10%. The composition material is maintained in contact with the oil with sufficient water to sustain the bacteria and for a period of time sufficient for the oil to be decomposed by the bacteria.

9 Claims, No Drawings

METHOD AND APPARATUS FOR DECOMPOSITION OF OIL

BACKGROUND OF THE INVENTION

1. Field of the Invention

The invention herein relates to the decomposition of waste oil. More particularly it relates to oil decomposition using natural materials.

2. Description of the Prior Art

It has been known that dealginated, partially dewatered kelp residue (which for brevity herein may be referred to as "kelp waste") is capable of absorbing various petroleum products. In 1991 applicant and colleagues obtained U.S. Pat. No. 5,009,790 for a method of cleaning up oil spills in the ocean or other body of water, such as would come from a leaking or wrecked oil tanker, using kelp waste as an absorbent. That patent disclosed that a variety of different petroleum products could be absorbed by the kelp waste. In that patent it was also taught to collect the oil-saturated kelp waste after absorption and then recover the oil by placing the oil-saturated kelp waste in a cracking furnace and thermally cracking the absorbed oil. The cracked oil products could then be recovered, and the kelp waste would be burned away at the cracking temperatures.

The system contemplated and disclosed in that patent therefore was directed to cleanup of an oil spill and recovery of the valuable spilled oil.

It has also been known that certain bacteria have the ability to "eat" oil, in that they act on oil products to convert the oil from hydrocarbon compounds to simpler compounds such as water and carbon dioxide. All such prior processes using such bacteria have required that the bacteria be separately obtained and placed in contact with the oil. Such was tried several times, for instance, by depositing quantities of bacteria on oil spills. Such trials were generally failures, in that the nature of many spilled oil products and the environmental conditions under which they are found were incompatible with bacteria decomposition.

An entirely different problem with oil products also exists, which is the problem of disposal of oil products in small quantities, which do not lend themselves to either easy recovery or easy disposal. In most cases such small quantities of oil products, such as motor oil drained from a vehicle engine, must be collected and accumulated into large volumes which can then be disposed of by burning. Alternatively, in some cases the collected oil is in sufficient quantities to permit its use economically as a reactant to form other products, or to be filtered or fractionated for reuse as a lubricant. In all of these cases, it is necessary to collect large quantities of such oil products and transport them, often over long distances, to the site where the products can be burned, reacted or recovered. This type of operation is usually hampered by the fact that many of the products contain additives or contaminants, such as metals, which must be removed before the oil can be burned, reacted or recovered.

SUMMARY OF THE INVENTION

I have now discovered that, because kelp waste contains bacteria which can break down oil products, placing such oil products in contact with the kelp waste and maintaining that contact for a period of time under conditions favorable to bacterial action, will result in decomposition of the oil products by the bacteria into by-products such as methane, water and carbon dioxide. In using this process, there is no need for high temperatures such as required for oil cracking. Further, since the appropriate conditions for bacterial activity occur directly as part of this process, there is no need for elaborate procedures to maintain bacterial activity. The process of the invention results in decomposition of the oil, not merely absorption of it, so that no further disposal is needed. The kelp waste can itself be readily disposed of after use, since it can be safely burned, incorporated into landfill or even used as mulch or organic builder in soil.

This process can be implemented for any quantity of oil disposal, but it is best suited for disposing of relatively small quantities of oil, such as could be collected by a person who personally changes the oil in his or her car, or by a small vehicle repair shop or facility, or on a family farm, or the like. To this end this invention also contemplates a small disposal device which I refer to as a "digester." The kelp waste can be placed in this digester, which has a decomposition chamber which is usually closed but ventilated, so that the aerobic bacteria can be sustained, and the oil to be decomposed is added to the digester chamber. Ambient conditions are maintained at temperatures generally in the range of about 50°–80° F. (10°–27° C.), under which the bacteria thrive, for a time sufficient for the bacteria to decompose the oil. Small amounts of water are added periodically to maintain the bacteria, and the digester can be replenished simply by adding more kelp waste.

DETAILED DESCRIPTION OF EXEMPLARY EMBODIMENTS

The critical element in the present method is the use of dealginated, partially dewatered kelp residue containing active bacteria which decompose the oil. Kelps are plants of the order laminariales. They are ocean plants, growing along shore lines in kelp beds. They commonly grow 100 to 200 feet (30 to 60 meters) in length and form what has been aptly described as "an underwater forest." Kelps are described in detail in Cronquist, Introductory Botany, 197 to 199 (1961).

The kelp plants are harvested by specially designed boats which cut off the tops of the kelp plants floating at the ocean surface. The collected cuttings are then brought to shore based chemical plants where the kelp is subjected to a variety of chemical reactions intended primarily to extract algin and algin-based chemicals (alginates) from the kelp. Such processes have been used for many years and are widely described in the literature; see for instance U.S. Pat. No. 1,814,981 to Thornley et al. and U.S. Pat. No. 3,773,753 to Wright et al. After the alginates are removed from the kelp, there is left a residue which is commonly referred to as cellular debris of the kelp (see the aforesaid Thornley et al. patent). This material is generally in the form of a wet pulpy mass, commonly containing as much as 85% or 90% water, with the remainder being the dealginated kelp debris and, in some cases, additional materials used in the kelp processing. The extracted algin materials are sent on for further chemical processing not relevant to the present invention.

The exact composition of the pulpy material discharged from the kelp processing operations is variable and all specific components are not known to the inventors. For the purposes of the present invention, however, it is sufficient merely to describe it as kelp from which the algin components have been removed, leaving whatever botanical and cellular residue remains; it will be referred to as "kelp residue." The limited variation of composition is expected, since kelp, being a natural material and found under a variety of environmental conditions in different oceans of the world, can be expected to show some natural variation in composition, as indicated in the aforementioned Cronquist text.

To be suitable for use in the present invention, the kelp residue discharged from the algin extraction process must be substantially dewatered, to bring the water content of the overall absorbent material down to a maximum of about 25%, and preferably down to about 5% to 10%. This can be done by any of a number of drying techniques, including spreading the kelp residue (with any included material, such as perlite) in a thin layer over a large surface area so that it can be air dried and sun dried, by subjecting the kelp residue to a mild heat treatment (with air or gas temperature not being so high that kelp residue becomes damaged), as for instance by placing the kelp residue in conventional drying units which have several tiers of porous platforms; and by similar techniques well known to those skilled in the art. It is possible to dry the kelp residue to a water content of less than about 5%, but for the purpose of the present invention such is unnecessary. Since the kelp residue may be readily dried to a water content in the range of 5% to 10%, and drying below that level becomes increasingly more difficult and expensive without any significant gain in the absorbent properties, it is preferred that the minimum water content be in the range of 5% to 10% for the absorbent material.

During the processing of kelp by the primary kelp collector and processor, it is common for other material such as filter aids to be used and to be discarded with the kelp residue. Common among such materials which may be found in the kelp residue is perlite. Perlite is a glassy material, generally of volcanic origin. When heated it expands explosively (much in the manner of popcorn) to form a very low density material exceptionally suited for use as a filter aid. The nature, properties, processing and use of perlite is conventional and widely described; see, for instance, Chesterman, "Perlite," in Lefond, ed., *Industrial Minerals and Rocks*, 927–934 ($4^{th}$ edn., 1975). For the purposes of the present invention the presence of perlite is advantageous, since it has some absorption value. The amount of perlite which may be present in association with the cellular kelp debris is not critical as long as it is not so great that the functioning of the kelp residue component is impaired. Normally, the amount of perlite present will be no greater than the amount of plant residue and normally will be somewhat less, if present at all.

During or after dewatering, the "kelp waste" (which term is hereafter used for brevity to mean the composite decomposition material including the kelp residue, the remaining water content and the associated materials, such as perlite, if any) may be granulated into particles of different sizes, such as flakes, powders, granules or the like. The kelp waste may then be spread or poured over an oil spill and left for a period of time. The kelp waste can be easily disposed of after use. Possible alternatives include burning the composite, incorporating it into landfills, or using the composite as mulch or an organic builder in soil.

An exemplary situation in which the kelp waste or composition would be used can now be illustrated. Typical drivers park their cars in a garage, on a driveway, or on any other comparable surface. Over an extended period of time, any car will leak and allow a build up of oil to accumulate onto the parked surface. The accumulation may even take the form of a puddle if it has gone on long enough. Alternatively, accumulation may be more substantial or less significant depending on the circumstances. However, in any situation, the oil can become a hazard if left unattended for any period of time. Therefore, the present invention allows any ordinary driver to effectively clean up the oil in an easy and safe manner.

The kelp waste composition of the present invention can be applied to the oil at any surface where it is contained or alternatively the composition may be applied to the oil after it has been collected into a collection chamber. Once the composition is placed in contact with the composition, the decomposition process begins. The bacteria in the kelp waste will eat the hydrocarbon components of the oil, thereby decomposing it. The process results in the decomposition of the oil into the end products of water and carbon dioxide, which are harmless by-products. The advantage to the present process is that there is minimal effort required to maintain the decomposition process. There is no requirement of either heating or cooling the composition while it is decomposing the oil. Additionally, there are no other procedures required to be performed in order to maintain the process. Such advantage allows any person to utilize the composition for decomposition of oil with little expertise or knowledge and requires practically no effort on their part. It has been found that 1 cubic yard of the kelp waste composition will degrade around 75 gallons of the oil. The amount of time needed for the oil to be decomposed will normally be in the range from 6 to 18 months, depending on conditions.

Additionally, the process can be utilized to dispose of oil that has been changed from a car. Many drivers do not have third parties change the oil in their cars and instead chose to perform such a task on their own. Once the oil change is complete, disposal of the used oil is required. As such, the process of the present invention allows for decomposition of the oil without having to transport it to another location. This process saves time and money because no additional steps are required. All that is necessary is that the discarded oil be placed in a ventilated container with the composition. The container is provided with a suitable thermostatically controlled heater to maintain a temperature in the range from about 50° to 80° F. (10°–27° C.) within the container, which is ideal for the hydrocarbon digesting bacteria. The container is then left for a time sufficient for the break down of the oil into water and carbon dioxide to take place. This process is equally beneficial for small vehicle repair shops or the like. It can significantly cut down on disposal costs because on site decomposition of the oil can be accomplished.

It will be evident that there are numerous embodiments of the present invention which are not expressly described above, but which are clearly within the scope and spirit of the invention. The above description is therefore to be considered exemplary only, and the actual scope of the invention is to be defined solely by the appended claims.

I claim:

1. A method for the decomposition of oil which comprises contacting said oil with a composition comprising de-alginated, partially dewatered kelp residue only, with no added bacteria;
    maintaining said kelp residue in contact with said oil so as to allow naturally occurring bacteria in said kelp residue to decompose said oil; and
    periodically adding to said kelp residue sufficient water to sustain said naturally occurring bacteria, for a period of time sufficient for said oil to be decomposed by said bacteria;
    whereby no extra bacteria are added to said oil during the decomposition process and said oil is decomposed only by said naturally occurring bacteria in said kelp residue.

2. A method as in claim 1 wherein said composition has a water content not greater than 25% by weight.

3. A method as in claim 1 wherein said composition has a water content in the range of about 5% to 10% by weight.

4. A method as in claim 1 wherein said composition also comprises perlite.

5. A method as in claim 1 wherein said oil is motor oil.

6. A method for the decomposition of oil which comprises:

collecting oil to be disposed of in a ventilated decomposition chamber of a digester;

placing a digester composition comprising de-alginated, partially dewatered kelp residue having a predetermined water content into the decomposition chamber in contact with the oil;

maintaining said kelp residue in contact with said oil over an extended time period so as to allow naturally occurring bacteria in said kelp residue to decompose said oil, said ventilated decomposition chamber allowing aerobic bacteria occurring naturally within said kelp residue to be sustained; and periodically adding to said kelp residue sufficient water to sustain said naturally occurring bacteria;

whereby no extra bacteria are added to the oil or the kelp residue during the decomposition process and said oil is decomposed within said ventilated decomposition chamber only by said naturally occuring bacteria in said kelp residue.

7. A method as in claim 6 wherein said digester maintains ambient conditions with a temperature range between 50° F.–80° F.(10° C.–27° C.).

8. A method for decomposition of oil on a ground surface, comprising the steps of:

applying a predetermined amount of a kelp waste composition comprising only a dealgiriated, partially dewatered kelp residue over an area of waste oil spilled on a ground surface, such that the area is completely covered with the kelp waste composition, wherein no external bacteria are added to the kelp waste composition and the kelp waste composition contains only bacteria which occur naturally in such kelp residue;

maintaining said kelp waste composition in contact with said waste oil for a sufficient decomposition time period for said oil to be decomposed by bacteria naturally occurring in said kelp waste composition, wherein no extra bacteria are added to said oil during said decomposition time period; and disposing of the used kelp waste composition.

9. A method for decomposition of waste oil, comprising the steps of:

placing a kelp waste composition comprising dealginated, partially dewatered kelp residue into a ventilated digester chamber, the kelp residue containing only bacteria which occur naturally in such kelp residue and no additional bacteria being added to said kelp waste composition;

placing waste oil into the digester chamber; and maintaining the internal temperature of said chamber in the range from 50° F. to 80° F. for an extended period of time sufficient for the naturally occurring bacteria in said kelp waste composition to decompose said waste oils;

whereby no additional bacteria are added to said waste oil during said extended period of time.

* * * * *